March 11, 1952 N. A. YOUNT 2,589,181
PIPE LAYING APPARATUS
Filed March 3, 1947 2 SHEETS—SHEET 1
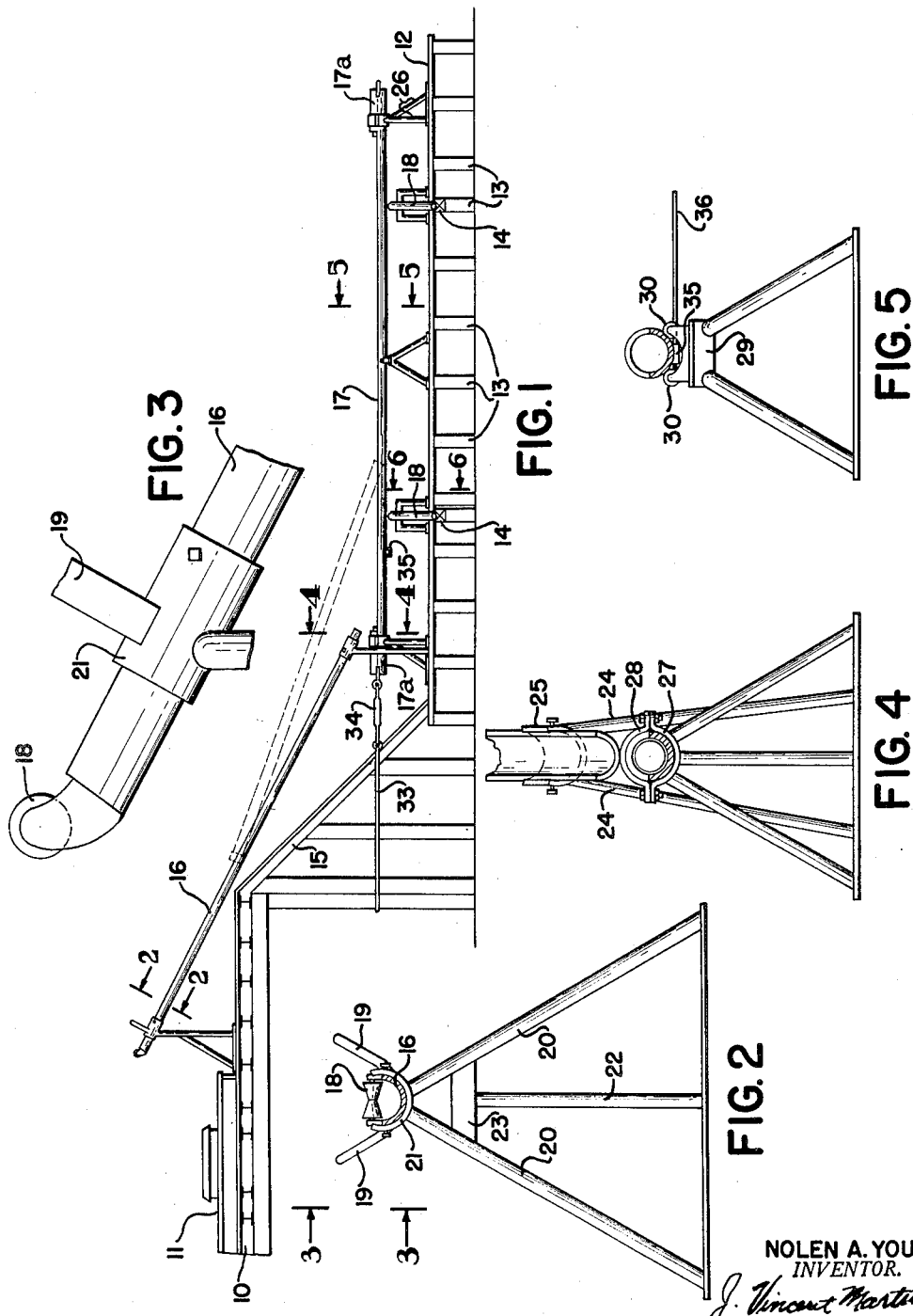
NOLEN A. YOUNT
INVENTOR.
ATTORNEYS March 11, 1952   N. A. YOUNT   2,589,181
PIPE LAYING APPARATUS
Filed March 3, 1947   2 SHEETS—SHEET 2

NOLEN A. YOUNT
*INVENTOR.*

BY
ATTORNEYS

Patented Mar. 11, 1952

2,589,181

UNITED STATES PATENT OFFICE 2,589,181

PIPE LAYING APPARATUS

Nolen A. Yount, Refugio, Tex.

Application March 3, 1947, Serial No. 732,095

4 Claims. (Cl. 214—1)

This invention relates to improvements in apparatus for laying pipe and refers more particularly to apparatus for transferring pipe sections broken from a pipe string as it is withdrawn from a well bore to a storage position or rack adjacent the derrick in which the pipe is transferred mechanically and manual guidance of an otherwise uncontrolled pipe section is not required.

The apparatus of this invention is useful around well rigs in drilling operations, clean-out operations and the like. In such operations it often becomes necessary to withdraw a string of pipe such as a drill stem oil string of casing, tubing or the like from a well bore. The pipe string is broken into sections usually comprising individual joints which are then separately passed out of the V of the derrick and down to the level of the pipe racks. On the rack the pipe sections are rolled to the far end of the rack or to the position where it contacts the next preceding joint. Often the pipe sections are stacked in a plurality of layers on the racks. This laying down operation involves considerable effort and is hazardous, frequently resulting in bodily injury to workmen, damage to property and the like. Heretofore, in laying down pipe it has been the practice in the field when pipe joint has been disconnected from the string for two workmen to guide the free end of the pipe, the other end being carried by the elevators, to a plane surface slide and the pipe is then lowered until its lower end engages the pipe walk of the rack. The elevators are then released, and the pipe joint slides, with manual guidance, onto the pipe walk. The pipe joint is then rolled along the rack to an out of the way position.

It is an object of this invention to provide apparatus for laying down pipe in which the heavy pipe sections are handled mechanically.

Another object is to provide apparatus for laying down pipe wherein the laying of the pipe in several layers on the pipe racks is facilitated.

A further object is to provide a pipe dumper trough useable in apparatus of the character described in which the pipe may be dumped on either side of the trough by an operator standing at some distance from the trough and remote from the side upon which the pipe joint is to be dumped.

Other and further objects of this invention will appear from the following description:

In the accompanying drawings which constitute a part of the instant specification and are to be read in conjunction therewith and wherein like reference numerals are used to designate like parts in the various views, Fig. 1 is a diagrammatic elevational view of pipe laying apparatus embodying this invention and illustrated in conjunction with the derrick floor of a well rig and an associated pipe rack;

Fig. 2 is an enlarged view taken along the line 2—2 in Fig. 1 in the direction of the arrows;

Fig. 3 is a view on a further enlarged scale taken along the line 3—3 in Fig. 2 in the direction of the arrows;

Fig. 4 is an enlarged view taken along the line 4—4 in Fig. 1 in the direction of the arrows;

Fig. 5 is an enlarged view taken along the line 5—5 in Fig. 1 in the direction of the arrows;

Figure 6:
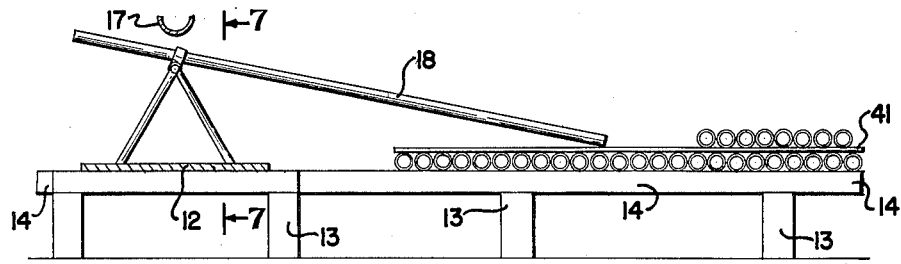
Fig. 6 is an enlarged fragmentary view taken along the line 6—6 in Fig. 1 in the direction of the arrows.

Referring to the drawings, numeral 10 designates the derrick floor of a well rig with the rotary table 11 carried thereby and at the right hand side of Fig. 1 is shown the pipe walk 12 supported from the ground by a plurality of support legs 13. A plurality of horizontal beams 14 are provided extending transversely of the pipe walk on which the pipe joints broken from a string of pipe withdrawn from a well bore may be racked. An inclined slide 15 joins the derrick floor to the pipe walk and is illustrated to show the type of plane surface slide heretofore used in laying down pipe. In the earlier practice a pipe joint when broken from the pipe string slides down the slide 15 guided manually by workmen.

According to this invention a chute 16 having a pipe receiving and guiding groove in its upper surface is supported in an inclined position between the derrick floor and pipe walk. This chute may be formed of large diameter pipe having its upper portion substantially cut away as is clearly shown in Fig. 2. The upper end of chute 16 is rigidly mounted on the derrick floor and the chute extends out of the V of the derrick. In the interest of simplicity the derrick, which is conventional, is not shown in the drawings. The lower end of chute 16 is securely mounted above pipe walk 12.

A dumper trough 17 is provided to receive the pipe ejected from the lower end of chute 16. The trough like portion of the dumper extends beneath the lower end of chute 16 and is aligned therewith. The dumper is mounted horizontally over the pipe walk and transversely of rack beams 14. The dumper is rotatably mounted in a fashion that will be hereafter discussed in more detail.

Beneath dumper 17 and extending normally thereof are a plurality of inclined skids 18. The lower ends of these skids rest upon beams 14 of the pipe rack. Thus, when a pipe joint or section is dumped from trough 17 it is guided by skids 18 onto beams 14 where it may be readily racked in an out of the way position. The particular mounting of the skids will be hereinafter more fully explained.

Referring back to chute 16, it will be seen that a roller 18 has been provided at the upper end of the chute and extends transversely of the chute groove. This roller is contacted by pipe joint as it passes over the chute and relieves to some extent the friction between the pipe joint and chute. Guide arms 19 are preferably provided for the chute to guide the pipe joints into contact with roller 18. Suitable means providing these arms is shown in Fig. 2 wherein the support structure for the upper end of the chute is shown as including divergent legs 20 secured at their upper end to a collar 21 in which the chute rests. The arms 19 are secured to the collar and extend upwardly and outwardly therefrom. Additional support is provided by diagonal brace 22 secured at its upper end to a cross bar 23 extending between the legs 20.

The mounting for the lower end of the chute is detailed in Fig. 4 and comprises support legs 24 secured at the upper end to a saddle 25. Saddle 25 in turn may be welded or otherwise fastened to the chute.

Figure 9:
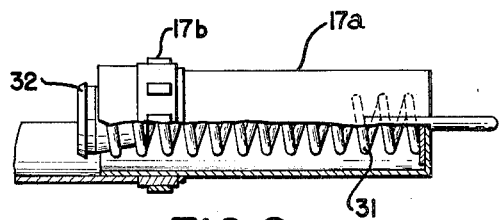
Fig. 9 is an enlarged view partially in section of the end of the dumper trough illustrating the mounting of the resilient bumpers.

Reference will now be made to the mounting for dumper trough 17 whereby the trough is rotatably mounted to facilitate dumping of pipe joints from the trough. The trough consists of an elongated member 17 having cylindrical end portions 17a with an intermediate trough-like portion. The end portions are journaled in support structures comprising divergent legs 26 secured at their upper ends to a bearing race segment 27. The upper race segment 28 of the circular bearing is secured by bolts or the like to the lower segment to provide a journal support for the dump trough. The inner surface of the race segments is grooved to provide a track for lugs 17b carried by the cylindrical portions of members 17. The lugs are shown in Fig. 9 and with the track of the race segments hold the dumper against longitudinal movement with respect to the supports. For added support it is usually preferable to provide a support for the intermediate portion of the trough. This is shown in detail in Fig. 5. The middle dumper support comprises a four-legged table 29 which carries rollers 30 on which the trough rests.

The circular end portions of trough 17 house resilient bumpers shown in detail in Fig. 9. These bumpers are made up of springs 31 secured at one end to the end of the trough, their free end holding a bumper block or cushion 32. As the pipe joints are received by trough 17 from the chute at a rather high velocity, the bumpers are required to absorb the shock of the impact of the pipe joint at the end of the trough. This often results in a re-bound of the pipe joint and the bumper at the end of the trough nearest the derrick absorbs this re-bound shock. The effect of the two bumpers in the trough is to more or less center each joint of pipe whereby the pipe may be readily racked in uniform positions on beams 14 facilitating picking up the pipe for future well operations, loading on trucks or the like.

Due to the velocity of the pipe joints as they enter trough 17 from the chute it is usually desirable to provide an additional anchor to resist the endwise movement imparted to the trough by the pipe joints. A suitable means for providing such an anchor is shown in Fig. 1 and includes the cable 33 and coupling member 34. The cable and coupling member are secured between one of the support legs of the derrick and the adjacent end of trough 17.

Means for dumping or rotating trough 17 preferably are such that the operator is in a position remote from the path of the pipe joint to be dumped. This may be accomplished by securing a ring sleeve 35 to the underside of trough 17 through which a lever 36 may be passed and employed to operate the dumper. Obviously the lever may be inserted from either side and by raising the lever to rotate the dumper the pipe joint will be deposited on the side remote from the workmen.

Figures 7, 8:
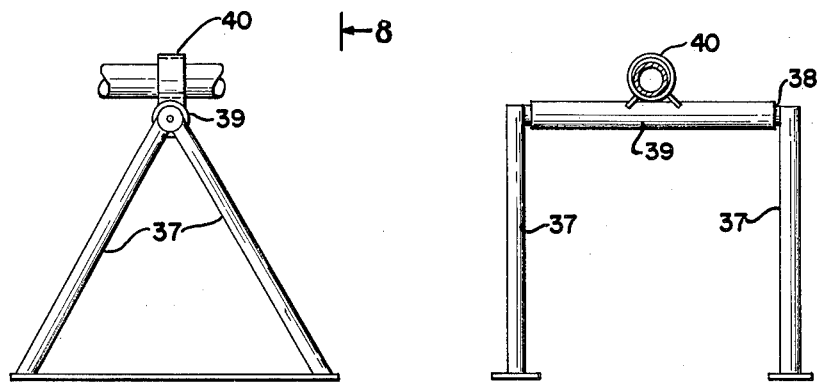
Fig. 7 is a view on an enlarged scale taken along the line 7—7 in Fig. 6 in the direction of the arrows.
Fig. 8 is a view taken along the line 8—8 in Fig. 7 in the direction of the arrows.

The mountings for skids 18 are shown in detail in Figs. 6 to 8, inclusive. The skids themselves may be pipe joints or other suitable elongated members and have a pivotal sliding mounting. The skid support is made up of two spaced apart two-legged support members 37 with a cross bar 38 therebetween. About the cross bar is a loose fitting sleeve or pipe 39 and secured to pipe 39 is a collar 40. Skids or tracks 18 are passed through the collar and one end is allowed to rest on beams 14 or the like. Obviously, with this mounting, the skids may be pushed through collar 40 to extend on either side of the trough and may be readily raised to rest on the upper layer of pipe when the pipe joints are to be stacked in a plurality of layers. Also, the lower end of the skids may be drawn close to dumper 17 whereby the pipe joints may be racked in close proximity to the dumper and pipe walk.

It is believed that the operation of the apparatus is apparent from the foregoing description. As a pipe section or joint is broken from the string of pipe as it is withdrawn from the well bore it is held up by the elevators connected to the upper end of the joint. The workmen guide the lower end of the joint into position in the groove of chute 16 and the pipe is lowered into engagement with roller 18. Elevators are then released and the pipe slides onto trough 17. The bumpers in the ends of the dumper trough absorb most of the shock imparted to the dumper by the pipe joints and the pipe comes to rest in the dumper. Skids 18 are placed in proper position for dumping the pipe on the desired side of the dumper and lever handle 36 is inserted in collar 35 to extend from the dumper on the side opposite the skids.

With the pipe joint at rest in dumper 17 the skids and lever in proper position, lever 36 is raised rotating the dumper so that the pipe joint falls therefrom onto skids 18 and rolls into position on rack beams 14. Skids 18 may be drawn up to deposit pipe joints very near the pipe walk. When one side of the rack has been filled the skids are advanced through collars 40 so that their long arm extends on the opposite side and this side of the rack may be filled up. The pipe may be racked in a plurality of layers by placing rolling strips 41 on top of each layer of pipe and resting the lower end of the skids either on the lower layer of pipe or on the rolling strips.

It will be seen from the foregoing description that the objects of the invention have been accomplished. There has been provided apparatus for laying down pipe in which the pipe is handled mechanically and a workman is never required to manually guide the travel of otherwise uncontrolled pipe joint. The construction is such that an operator may release the pipe from the dumper trough from a position remote from the direction of travel of the dumped pipe. The arrangement is such that a pipe string may be readily broken as it is withdrawn from a well bore and quickly laid down section by section in a manner involving considerably less effort and hazard than heretofore encountered in operations of this character.

From the foregoing it will be seen that this invention is one well adapted to attain all of the ends and objects hereinabove set forth together with other advantages which are obvious and which are inherent to the structure.

It will be understood that certain features and sub-combinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having described my invention, I claim:

1. A pipe dumper useable in conjunction with laying pipe in well operations comprising an elongated member having cylindrical end portions and an intermediate trough portion, resilient bumpers housed within the end portions, and support structures, the ends of the elongated member journaled in the support structures.

2. A pipe dumper useable in conjunction with laying pipe in well operations comprising an elongated member having cylindrical end portions and an intermediate trough portion, resilient bumpers housed within the end portions, support structures, the ends of the elongated member journaled in the support structures, and a third support structure having a roller connection with the elongated member intermediate the ends of the member.

3. A pipe dumper as set forth in claim 1, wherein each support structure includes a split bearing collar adapted to engage about the cylindrical end portion of the trough, and coacting means within each bearing collar and on the adjacent end portion for preventing longitudinal movement of the trough with respect to the bearing collar.

4. A pipe dumper usable in conjunction with laying pipe in well operations comprising an elongated member having cylindrical end portions and an intermediate trough portion, a resilient bumper housed within one end portion, and support structures, the ends of the elongated member being rotatably supported by the support structures.

NOLEN A. YOUNT.

REFERENCES CITED

The following references are of record in the file of this patent:

UNITED STATES PATENTS

| Number | Name | Date |
| --- | --- | --- |
| 1,641,998 | Von Der Horst | Sept. 13, 1927 |
| 1,829,879 | Stephens | Nov. 3, 1931 |
| 2,201,813 | Doud | May 21, 1940 |
| 2,220,550 | Shepherdson | Nov. 5, 1940 |
| 2,335,719 | Williams | Nov. 30, 1943 |
| 2,347,639 | Platt | Apr. 25, 1944 |
| 2,397,192 | Meyerbach | Mar. 26, 1946 |
| 2,448,324 | Pool | Aug. 31, 1948 |